United States Patent
Ando et al.

[11] Patent Number: 5,158,320
[45] Date of Patent: Oct. 27, 1992

[54] SUSPENSION SYSTEM FOR VEHICLES

[75] Inventors: Fumitaka Ando; Toshiro Kondo, both of Hiróshima, Japan

[73] Assignee: Mazda Motor Corp., Hiroshima, Japan

[21] Appl. No.: 632,457

[22] Filed: Dec. 21, 1990

[30] Foreign Application Priority Data

Dec. 25, 1989 [JP] Japan .................. 1-337752
Dec. 25, 1989 [JP] Japan .................. 1-337753
Dec. 25, 1989 [JP] Japan .................. 1-337754

[51] Int. Cl.[5] ................................ B60G 3/00
[52] U.S. Cl. ............................. 280/691; 280/675; 280/701
[58] Field of Search ............ 280/688, 691, 95.1, 280/660, 661, 668, 675, 696, 724, 673, 667, 701

[56] References Cited

U.S. PATENT DOCUMENTS

| 4,715,615 | 12/1987 | Kijima et al. | 280/701 |
| 4,744,586 | 5/1988 | Shibahata | 280/661 |
| 4,832,364 | 5/1989 | Kikuchi et al. | 280/701 |
| 4,871,187 | 10/1989 | Schaible | 280/701 |

FOREIGN PATENT DOCUMENTS

| 3714034 | 6/1988 | Fed. Rep. of Germany | 280/701 |
| 0139807 | 8/1983 | Japan | 280/701 |
| 0033110 | 2/1985 | Japan | 280/691 |
| 0031812 | 2/1988 | Japan | 280/675 |
| 64-49404 | 3/1989 | Japan | 280/673 |

Primary Examiner—Charles A. Marmor
Assistant Examiner—Paul Dickson
Attorney, Agent, or Firm—Thompson, Hine and Flory

[57] ABSTRACT

A suspension system for vehicles, in which the supporting center on the vehicle body side of an assist link is offset from the axial center of a bush of a suspension arm member so as to control the swinging locus of the suspension arm member at bumping of the wheel by the different swinging locus of the assist link. By the supporting center on the wheel support member side of the suspension arm member which is offset from the central axis of rotation of the wheel, the wheel at bumping is made toe-in for oversteering tendency to enhance turning ability at turning or is made toe-out for understeering tendency to enhance driving stability at turning and the camber angle of the wheel is made larger for enhancing straight driving stability or is made smaller for enhancing riding comfort and reducing steering power required for turning. Thus, the present invention makes it possible to change properly the toe-control and the camber-control according to characteristics of each kind of vehicle.

25 Claims, 18 Drawing Sheets

SUSPENSION SYSTEM FOR VEHICLES

BACKGROUND OF THE INVENTION

1. Field of the Invention

This invention relates to a suspension system for a vehicle having a suspension arm member whose inner end is supported, at two points spaced apart in a longitudinal direction of the vehicle body, by a vehicle body member and an assist link, particularly to a measure by which setting for riding comfort and driving stability can be changed as desired.

2. Description of the Prior Art

The Japanese Utility Model Registration Application Laying Open Gazette No. 64-49404, for example, discloses a suspension arm member whose inner end is supported swingably, at two points spaced apart in a longitudinal direction of the vehicle body, to a vehicle body member through the medium of bushes (each having an axial center extending in horizontal direction) and whose outer end is supported swingably to a wheel support member and an assist link fixed swingably to an intermediate part of the suspension arm member and to the vehicle body member, in which a support center of the assist link on the vehicle body side is positioned on the axial center of the bush of the suspension arm member.

In the above case, provision of the assist link heightens effectively the lateral rigidity of the suspension arm member which resists external force from the vehicle width direction at turning of the vehicle body, for example, and thus driving stability at turning is improved. Provision of the assist link also makes it possible to utilize a softer bush near the assist link, whereby input from a longitudinal direction of the vehicle body which acts when a vehicle runs over roughness of the road, for example, is let escape by moving the wheel positively in front and rear direction and as a result, compliance in front and rear direction is ensured and riding comfort is improved.

Recently, it has been demanded to toe-control the wheel positively in response to its bumping at turning or at running over roughness of the road and to camber-control positively the camber angle (an inclining angle of the wheel in relation to a vertical line of the wheel support member). More particularly, it has been demanded to change properly and freely the toe-control and the camber-control of the wheel which bumps at turning, at running over roughness of the road, etc., according to characteristics of each kind of vehicle by directing the bumping wheel to an oversteering tendency (turning ability at turning is heightened) by making it toe-in, by directing it to an understeering tendency (driving stability at turning is heightened) by making it toe-out, by heightening the straight driving stability by making the camber angle of the wheel larger, by heightening comfortableness to ride in and lightening steering wheel holding power at turning by making the camber angle of the wheel smaller, etc.

In the above-mentioned conventional suspension system, however, since the support center on the vehicle body side of the assist link is positioned on the axial center of the bush, the swinging locus in vertical direction of the suspension arm member and that of the assist link coincide with each other and therefore, the wheel which bumps at turning, at running over roughness of the road, etc., only swings in vertical direction with the support parts (on the vehicle body side) of the suspension arm member and the assist link as fulcrums. Thus, it is impossible to effect the positive change of toe-control and camber-control at bumping of the wheel.

In the above-mentioned suspension system, since the support part (on the vehicle body side) of the suspension arm member is supported by the vehicle body member through the medium of a bush or the like, even if a bush close to the assist link (out of the bushes of two support parts on the vehicle body side) is made soft, quantity of moving the bumping wheel rearwardly against input from the front of the vehicle body when a vehicle runs over roughness of the road, for example, becomes very small. Therefore, there is a limit in ensuring the compliance, when input from the front of the vehicle body acts, by softness of a bush close to the assist link. Thus, it is impossible to ensure full riding comfort when the vehicle runs over roughness of the road, for example.

SUMMARY OF THE INVENTION

The present invention has been made in view of the above short comings and has for its object to enlarge the degree of freedom of toe-control and camber-control of the wheel at bumping by differentiating the swinging locus of the assist link from that of the suspension arm member.

In order to attain the above object, the suspension system of the vehicle according to the present invention primarily comprises a suspension arm member whose inner end is supported swingably or pivotally to a vehicle body member at two points spaced apart in longitudinal direction of the vehicle body through the medium of bushes (each having an axial center extending in horizontal direction) and whose outer end is supported swingably to a wheel support member and an assist link which is supported swingably to the intermediate part of said suspension arm member and said vehicle body member, in which the support center on the wheel support member side at an outer end of the suspension arm member is made eccentric to the central axis of rotation of the wheel and the support center on the vehicle body side of said assist link is made eccentric to the axial center of said bush.

Under the above construction of the present invention, since the support center on the wheel support member side of the suspension arm member is made eccentric to the central axis of rotation of the wheel and the support center on the vehicle body side of the assist link is made eccentric to the axial center of the bush of the suspension arm member, the swinging locus in vertical direction of the suspension arm member and that of the assist link at bumping of a turning wheel are different. Thus, the swinging locus of the suspension arm member is controlled by the swinging locus of the assist link, whereby the toe-control and the camber-control of a turning wheel at bumping are changed positively by the suspension arm member whose support center on the wheel support member side is made eccentric to the central axis of rotation of the wheel.

BRIEF DESCRIPTION OF THE DRAWINGS

The accompanying drawings show preferred embodiments of the present invention.

FIG. 1 through FIG. 3 show a first embodiment of the present invention, in which FIG. 1 is a front view of the suspension system on the right front wheel side, in which the support center on the wheel support member side of the suspension arm member is shifted horizontally relative to the central axis of rotation of the wheel and the support center on the vehicle body side of the assist link is made eccentric below the horizontal line which intersects the axial center of the bush at right angles; FIG. 2 is a plan view of the suspension system shown in FIG. 1; and FIG. 3 is a perspective view of the suspension system shown in FIG. 1, as seen from the diagonal front direction;

FIG. 4 and FIG. 5 show respectively a second embodiment of the present invention, in which FIG. 4 is a front view of the suspension system on the right front wheel side, in which the support center on the wheel support member side of the suspension arm member is shifted horizontally relative to the central axis of rotation of the wheel and the support center on the vehicle body side of the assist link is made eccentric above the horizontal line which intersects the axial center of the bush at right angles; and FIG. 5 is a plan view of the suspension system shown in FIG. 4;

FIG. 6 and FIG. 7 show respectively a third embodiment of the present invention, in which FIG. 6 is a front view of the suspension system on the right front wheel side, in which the support center on the wheel support member side of the suspension arm member is shifted horizontally relative to the central axis of rotation of the wheel and the support center on the vehicle body side of the assist link is offset toward the outer side of the vehicle body relative to the central axis of rotation of the bush on the horizontal line which intersects the central axis of rotation of the bush at right angles; and FIG. 7 is a plan view of the suspension system shown in FIG. 6;

FIG. 8 and FIG. 9 show respectively a fourth embodiment of the present invention, in which FIG. 8 is a front view of the suspension system on the right front wheel side, in which the support center on the wheel support member side of the suspension arm member is shifted horizontally relative to the central axis of rotation of the wheel and the support center on the vehicle body side of the assist link is offset toward the inner side of the vehicle body relative to the central axis of rotation of the bush on the horizontal line which intersects the central axis of rotation of the bush at right angles; and FIG. 9 is a plan view of the suspension system shown in FIG. 8;

FIG. 10 through FIG. 12 show respectively a fifth embodiment of the present invention, in which FIG. 10 is a front view of the suspension system on the right front wheel side, in which the support center on the wheel support member side of the suspension arm member is shifted below relative to the central axis of rotation of the wheel and the support center on the vehicle body side of the assist link is offset above the horizontal line which intersects the axial center of the bush at right angles;

FIG. 11 is a plan view of the suspension system shown in FIG. 10 and FIG. 12 is a perspective view of the suspension system shown in FIG. 10, as see from the diagonal front direction;

FIG. 13 and FIG. 14 show respectively a sixth embodiment of the present invention, in which FIG. 13 is a front view of the suspension system on the right front wheel side, in which the support center of the assist link is offset toward the inner side of the vehicle body relative to the axial center of the bush on the horizontal line which intersects the axial center of the bush at right angles; and FIG. 14 is a plan view of the suspension system shown in FIG. 13;

FIG. 15 and FIG. 16 show respectively a seventh embodiment of the present invention, in which FIG. 15 is a back view of the suspension system on the right front wheel side, in which the support center on the wheel support member side of the suspension arm member is shifted below relative to the central axis of rotation of the wheel and the support center on the vehicle body side of the assist link is offset below the horizontal line which intersects the axial center of the bush at right angles; and FIG. 16 is a plan view of the suspension system shown in FIG. 15;

FIG. 17 and FIG. 18 show respectively an eighth embodiment of the present invention, in which FIG. 17 is a back view of the suspension system on the right front wheel side, in which the support center on the wheel support member side of the suspension arm member is shifted below relative to the central axis of rotation of the wheel and the support center on the vehicle body side of the assist link is offset toward the outer side of the vehicle body relative to the axial center of the bush on the horizontal line which intersects the axial center of the bush at right angles; and FIG. 18 is a plan view of the suspension system shown in FIG. 17.

DETAILED DESCRIPTION OF THE INVENTION

Each of the preferred embodiments of the present invention is described below, with reference to the accompanying drawings.

Figure 1:
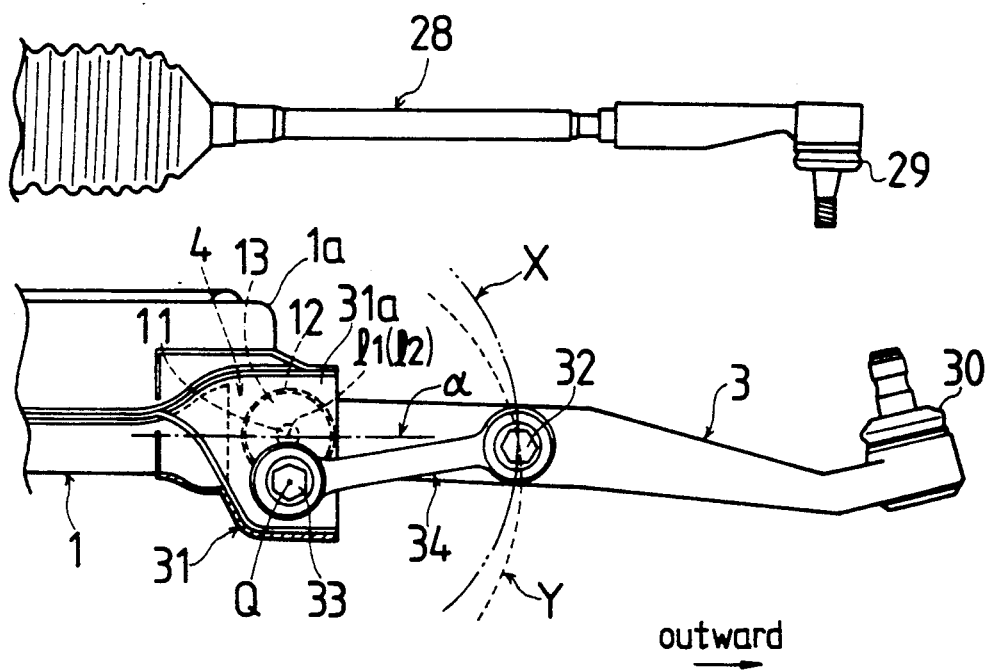
Figure 2:
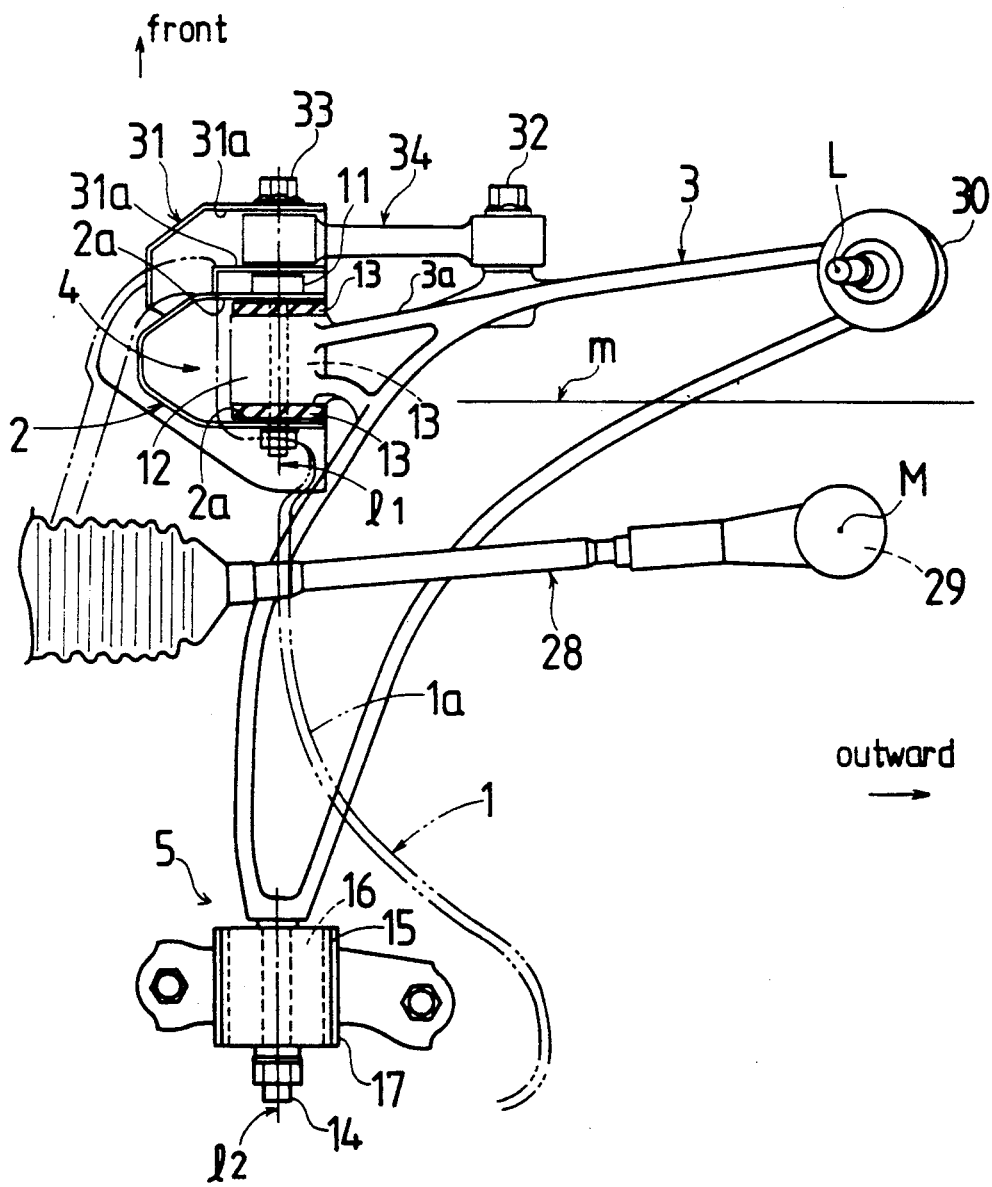
Figure 3:
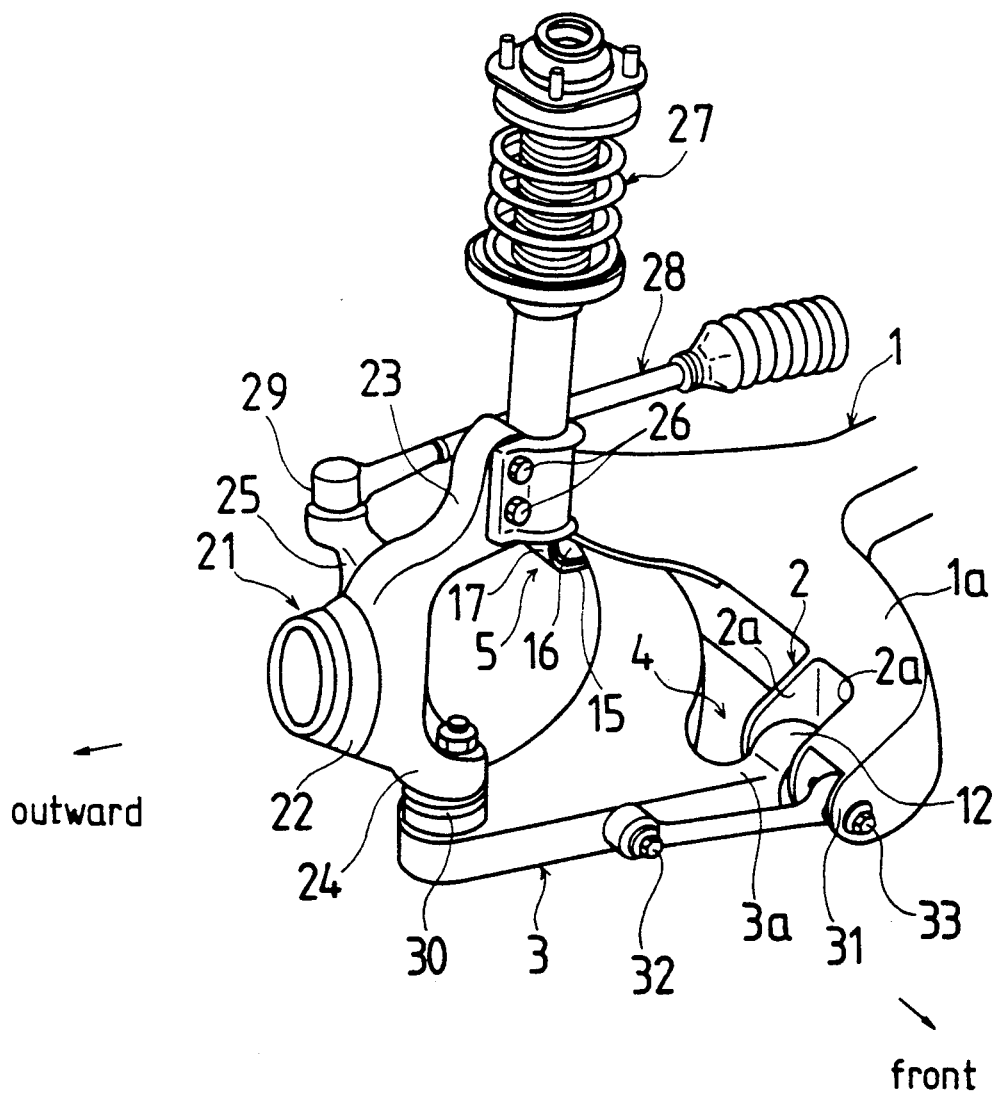

FIG. 1 through FIG. 3 show a suspension system on the right front wheel side of a vehicle according to the first embodiment of the present invention. Reference numeral 1 designates a front cross member (a vehicle body member) extending in right and left direction of a vehicle fixed to the vehicle body side. An extension part 1a extending in longitudinal direction of a vehicle body is provided at a side end portion of the front cross member 1. Provided at a front end portion of the extension part 1a is a first bracket (substantially ] shape in cross section) which opens to the outer side of the vehicle body (left side in the drawing). Provided outwardly of the side end of the front cross member 1 is a suspension arm member 3 of wishbone type (substantially quadrant in shape). Provided at about the intermediate part of the suspension arm member 3 is a projection 3a projecting inwardly of the vehicle body.

Provided at a front end (inner end) of the projection part 3a of the suspension arm member 3 is a vehicle body front side support part 4 which supports the first bracket 2 of the extension part 1a. Provided at a rear end portion (inner end) of the suspension arm member 3 is a vehicle body rear side support part 5 which supports said rear end portion to a far end portion of the extension part 1a of the front cross member 1.

The vehicle body front side support part 4 is composed of the first bracket 2, a first bolt member 11 which is passed through opposed faces 2a of the first bracket 2 with an axial center $l_1$ (one-dot chain line in FIG. 2), a first outer tube member 12 disposed outwardly of the first bolt member 11 and at a top end of the projection part 3a of the suspension arm member 3 and a first bush 13 which is disposed between the first bolt member 11 and the first outer tube member 12 and also between the opposed faces of the first outer tube member 12 and opposed faces 2a of the first bracket 2. The vehicle body rear side support part 5 is composed of a second bolt member 14 which projects rearwardly from the rear end face of the suspension arm member 3 and has an axial center $l_2$ (one-dot chain line in FIG. 2) common with the axial line $l_1$ of the first bolt member 11, a second outer tube member 15 disposed outwardly of the second bolt member 14, a second bush 16 arranged between the second bolt member 14 and the second outer tube member 15 and a second bracket 17 which fixes the second outer tube member 15 to the undersurface of the rear end portion of the extension part 1a of the front cross member 1. The suspension arm member 3 is supported swingably at two points (the vehicle body front side support part 4 and the vehicle body rear side support part 5) spaced apart in longitudinal direction of the vehicle body, to the extension part 1a of the front cross member 1.

Provided outwardly of the suspension arm member 3 is a wheel support member 21 to support a right front wheel (not shown in the drawing). The wheel support member 21 comprises a wheel support part 22 of substantially tubular shape, an upward extension part 23 projecting from the upper end of the wheel support part 22 in diagonal and upward direction, a front side extension part 24 projecting from the front end of the wheel support part 22 in diagonal and rearward direction and a rear side extension part 25 projecting from the rear end of the wheel support part 22 in diagonal and rearward direction. Provided at a top end of the upper side extension part 23 of the wheel support member is a coil spring 27 which extends substantially in vertical direction and is fixed by bolts 26 at the lower end portion thereof. Supported at the top end (rear end portion) of the rear side extension part 25 of the wheel support member 21 through the medium of a first joint 29 of pivot type is a side end part of a tie rod 28 which extends in right and left direction of the vehicle body for pulling in or pushing out the rear side of the wheel support member 21 toward the inner side of the vehicle body and toward the outer side of the vehicle body respectively by manipulating a steering wheel (not shown in the drawing). The outer end portion (front end portion) of the suspension arm member 3 is supported to the top end (front end portion) of the front side extension part 24 of the wheel support member 21 through the medium of a second joint 30 of pivot type. In this case, the second joint 30 which is a supporting point L of the top end of the front side extension part 24 of the wheel support member 21 and the outer end portion of the suspension arm member 3 (wheel side support point L on the wheel support member side) is located frontwardly of the central axis m (thin solid line shown in FIG. 2) of the rotation of the right front wheel. The first joint 29 which is the supporting point M of the top end of the front side extension part 25 of the wheel support member 21 and the side end portion of the tie rod 28 is located rearwardly of the central axis m of the rotation of the right front wheel.

Provided at the front end (frontwardly of the vehicle front side support member 4) of the extension part 1a of the front cross member 1 is a third bracket 31 of ] shape in cross section opening to the outer side of a vehicle body. Provided at a substantially intermediate part of the front end surface of the suspension arm member 3 (base end of the projecting part 3a) is a hole part (not shown in the drawing) having an axis extending in front and rear direction. In front of the suspension arm member 3, an assist link 34 extending in right and left direction of the vehicle body, with its outer end portion supported rotatably by the first binding bolt 32 to the hole part of the suspension arm member 3 and its inner end portion supported rotatably by the second binding bolt 33 passing between opposed faces 31a to the third bracket 31, is supported swingably to the front cross member 1 (the third bracket 31).

The vehicle body side supporting center Q which is the axial center of the second binding bolt 33 relative to the front cross member 1 (the third bracket 31) of the assist link 34 is positioned eccentrically below the horizontal line 2 (one-dot chain line in FIG. 1) extending in right and left direction of the vehicle body and intersecting the axial centers $l_1$, $l_2$ of the bushes 13, 16 of the first and the second support parts 4, 5 at right angles.

In the above embodiment, since the vehicle body supporting center Q of the assist link 34 is offset to the axial centers $l_1$, $l_2$ of the bushes 13, 16 (first and second bolt members 12, 14) of the first and the second support parts 4, 5, the swinging locus in vertical direction of the suspension arm member 3 and that of the assist link 34 (both with the first cross member 1 as fulcrum) at bumping of the turning wheel are different as shown in FIG. 1. Thus, the swinging locus of the suspension arm member 3 is controlled by that of the assist link 34 and toe-control of the turning wheel at bumping is changed positively and its degree of freedom can be enlarged.

In the above embodiment, since the swinging locus X (two-dot chain line in FIG. 1) of the suspension arm member 3 is controlled by the swinging locus Y of the assist link 34 with the vehicle body supporting center Q positioned eccentrically below the horizontal line 2 extending in right and left direction of the vehicle body and intersecting the axial centers $l_1$, $l_2$ of the bushes 13, 16 at right angles and the front part side of the turning tire at bumping is drawn to the inner side of the vehicle body due to the wheel side supporting center L of the suspension arm member 3 being positioned forwardly of the central axis m of rotation of the wheel and toe-control is changed positively to toe-in, with the result that oversteering tendency (turning ability at turning is enhanced) can be set.

A description is made below of the second embodiment of the present invention.

Figure 4:
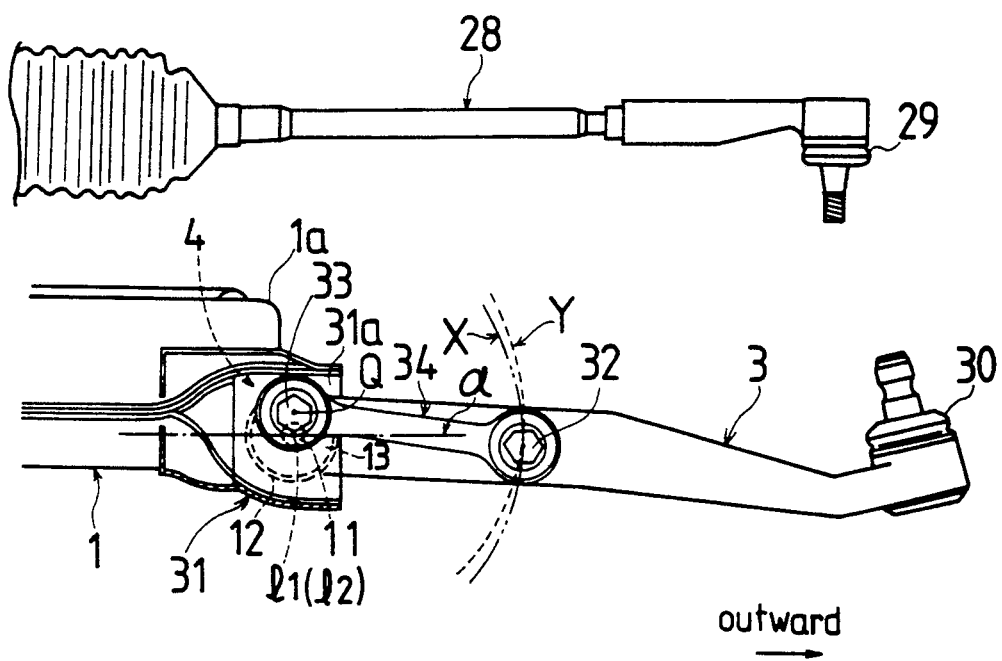
Figure 5:
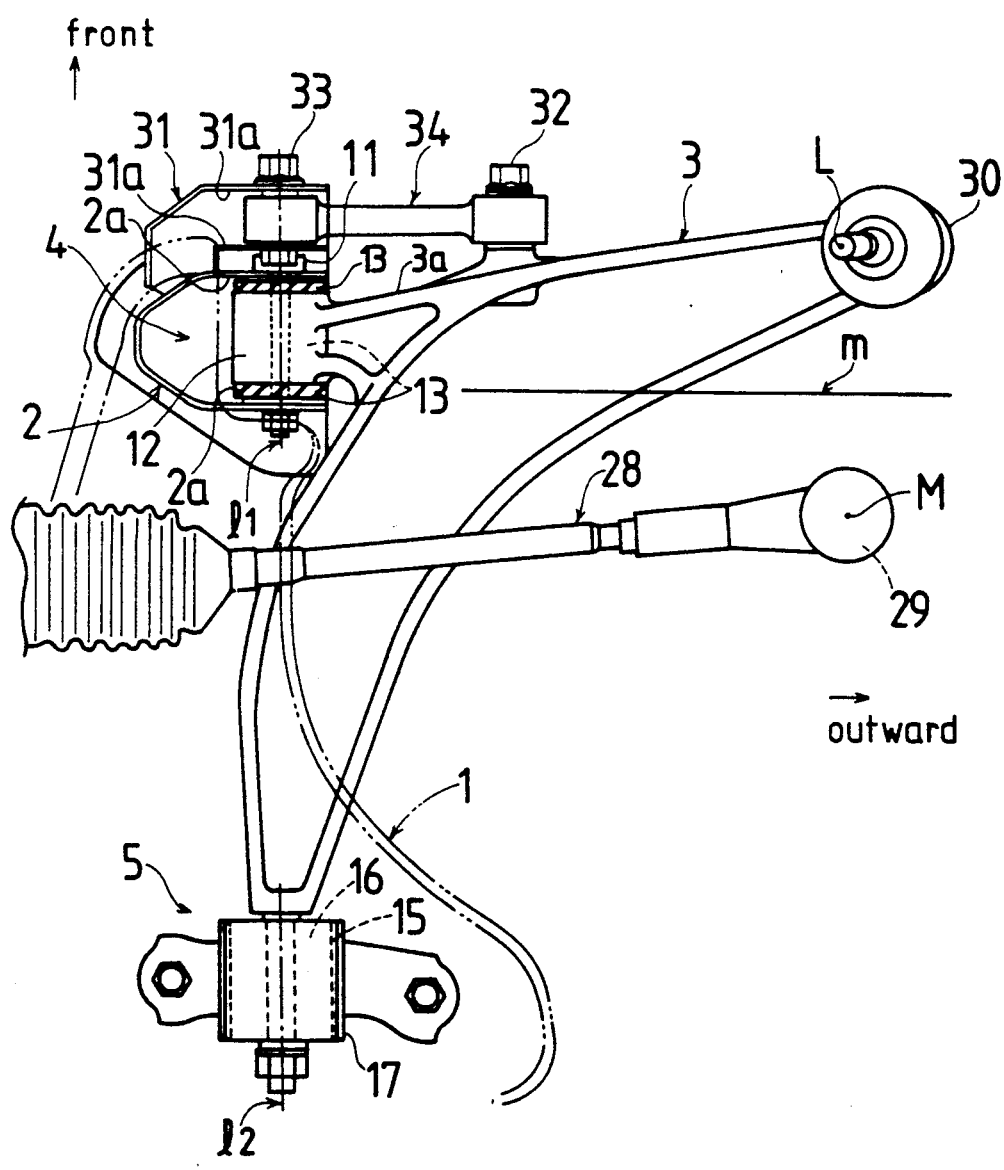

FIG. 4 and FIG. 5 show the second embodiment of the present invention (in this embodiment and the following embodiments, parts which are the same as those in FIG. 1 through FIG. 3 are given the same reference numerals and description thereof is omitted), wherein the position at which the supporting center on the vehicle body side of the assist link is offset to the axial center of the bush is changed. More particularly, the supporting center Q of the vehicle body side of the second binding bolt 33 in relation to the front cross member 1 is positioned eccentrically above the horizontal line 2 extending in right and left direction of the vehicle body and intersecting the axial centers $l_1$, $l_2$ of the bushes 13, 16 of the first and the second support parts 4, 5 at right angles.

In the above case, the swinging locus X (two-dot chain line in FIG. 4) of the suspension arm member 3 is controlled by the swinging locus Y (broken line in FIG. 4) of the assist link 34 with the supporting center on the vehicle side Q positioned eccentrically above the horizontal line 2 intersecting the axial centers $l_1$, $l_2$ of the bushes 13, 16 of the first and the second support parts at right angles. Therefore, the front part side of the turning tire at bumping is pushed to the outer side of the vehicle body due to the supporting center L on the wheel side of the suspension arm member 3 being positioned forwardly of the central axis m of rotation of the wheel, with the result that toe-control is changed positively to the toe-out and the understeering tendency (driving stability at turning is enhanced) can be set.

A description is made below of the third embodiment of the present invention.

Figure 6:
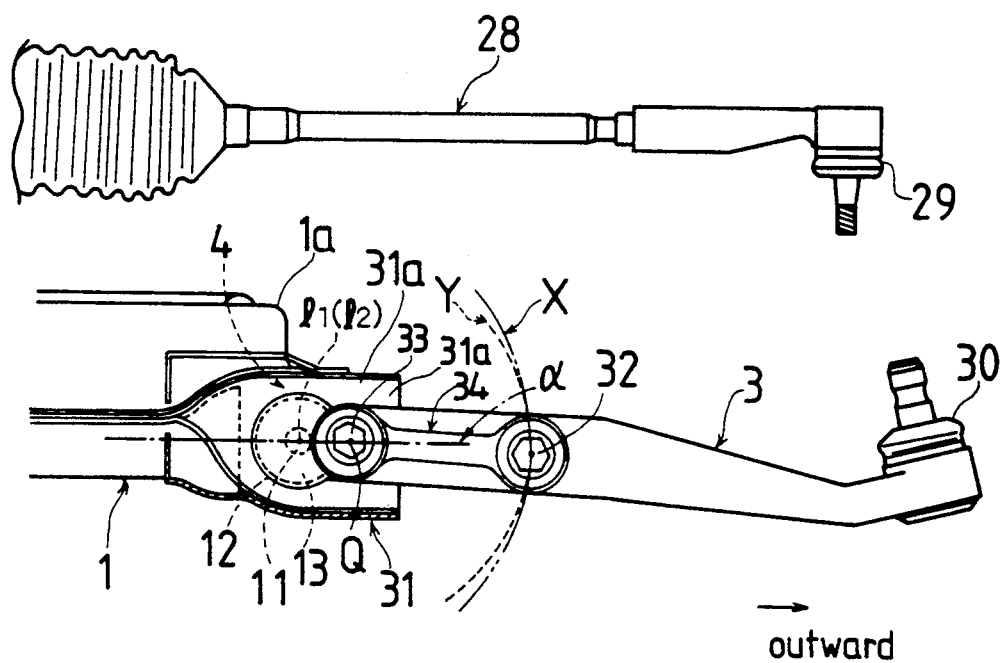
Figure 7:
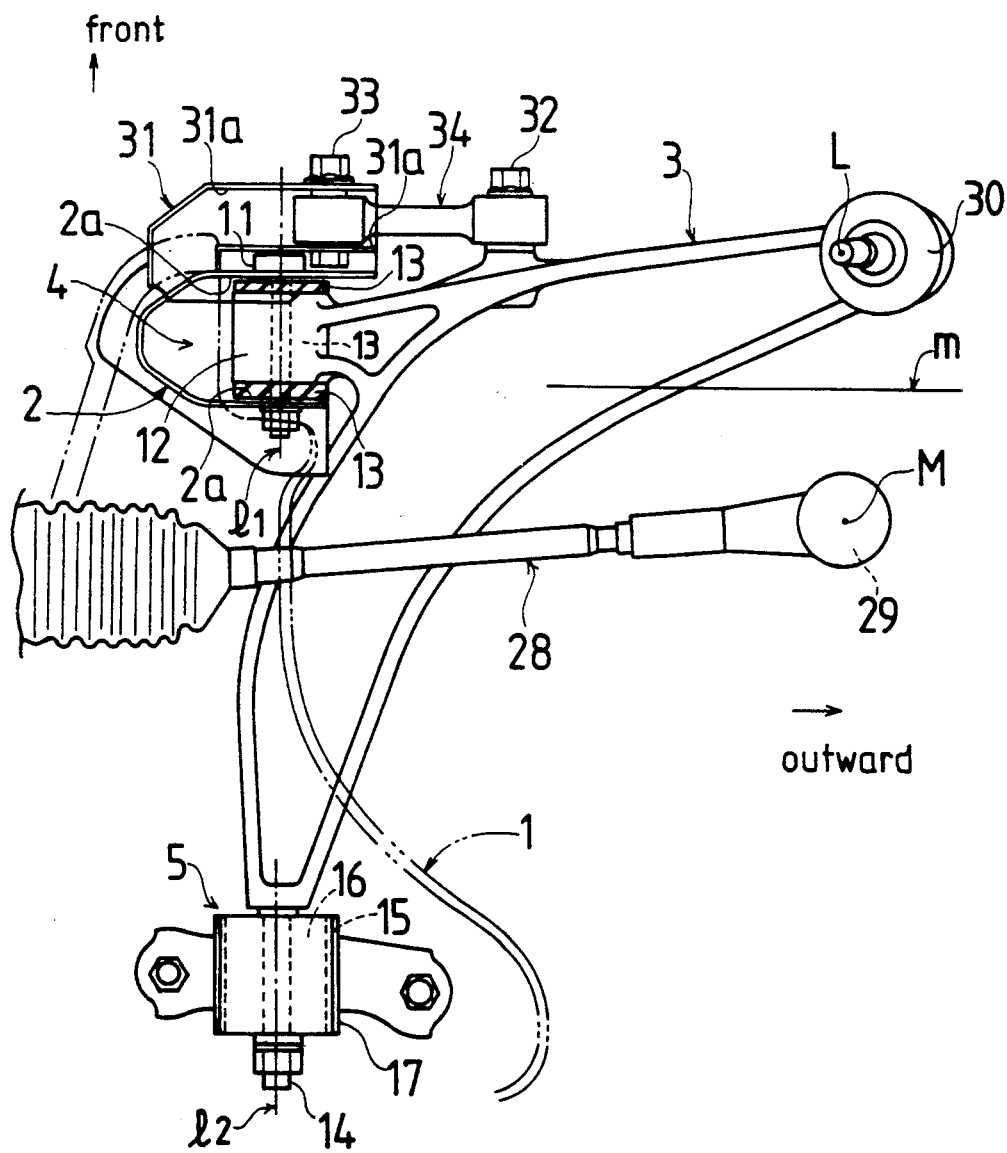

FIG. 6 and FIG. 7 show the third embodiment of the present invention. In this embodiment, the position at which the supporting center on the vehicle body side of the bush is changed. More particularly, the supporting center Q on the vehicle body side of the assist link 34 in relation to the cross member 1 relative to the axial lines $l_1$, $l_2$ of the bushes 13, 16 on the horizontal line 2 extending in right and left direction of the vehicle body and intersecting the axial centers $l_1$, $l_2$ of the bushes 13, 16 of the first and the second support parts at right angles.

In the above case, the swinging locus X (two-dot chain line in FIG. 6) of the suspension arm member 3 is controlled by the swinging locus Y (broken line in FIG. 6) of the assist link 34 with the supporting center Q on the vehicle body side positioned offset to the outer side of the vehicle body relative to the axial centers $l_1$, $l_2$ of the bushes 13, 16 of the first and the second support parts 4, 5. Therefore, the front part side of the turning tire at bumping is drawn to the inner side of the vehicle body due to the supporting center L of the suspension arm member 3 being positioned forwardly of the central axis of rotation of the wheel, with the result that toe-control is changed positively to toe-in and oversteering tendency (turning ability at turning is enhanced) can be set.

A description is made below of the fourth embodiment of the present invention.

Figure 8:
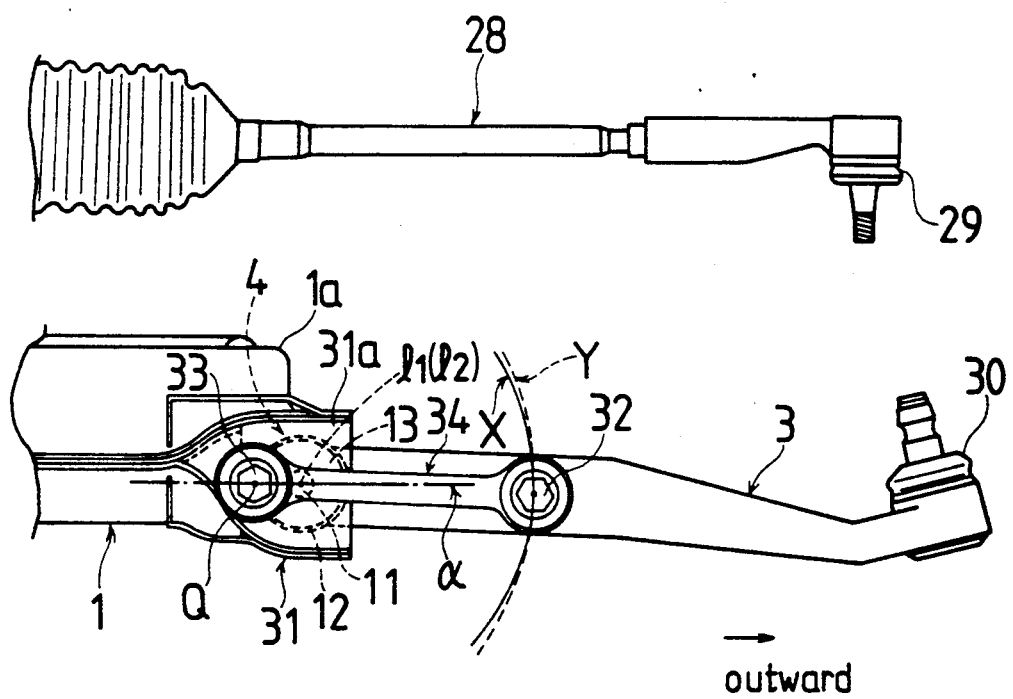
Figure 9:
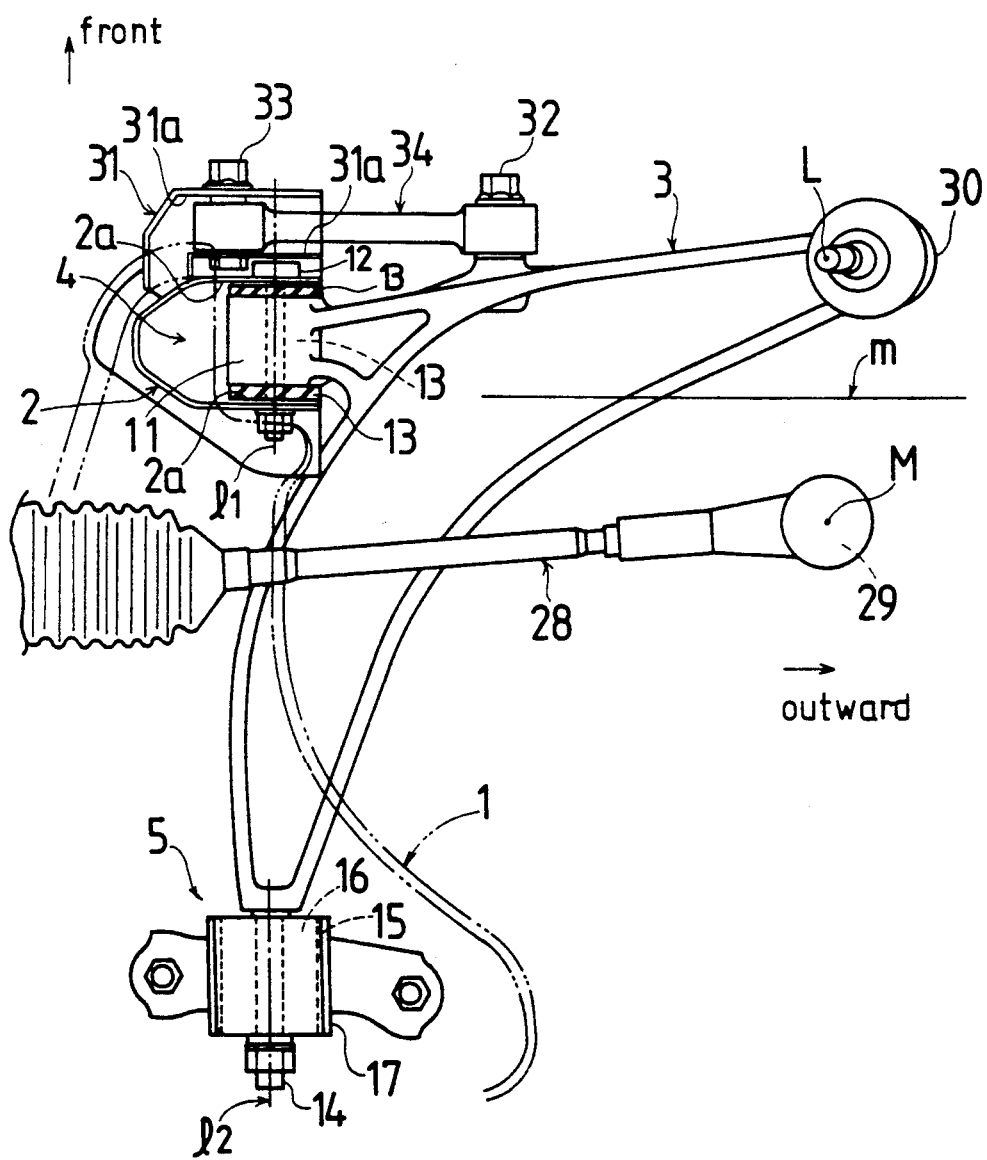

FIG. 8 and FIG. 9 show the fourth embodiment of the present invention. In this embodiment, the position at which the supporting center on the vehicle body side of the assist link is offset in relation to the axial center of the bush is changed. More particularly, the supporting center Q on the vehicle body side of the second binding bolt 33 of the assist link 34 in relation to the cross member 1 is positioned offset to the inner side of the vehicle body relative to the axial centers $l_1$, $l_2$ of the bushes 13, 16 on the horizontal line 2 extending in right and left direction of the vehicle body and intersecting the axial centers $l_1$, $l_2$ of the bushes 13, 16 of the first and the second support parts at right angles.

In the above case, the swinging locus X (two-dot chain line in FIG. 8) of the suspension arm member 3 is controlled by the swinging locus Y (broken line in FIG. 8) of the assist link 34 with the supporting center Q on the vehicle body side positioned eccentrically to the outer side of vehicle body relative to the axial centers $l_1$, $l_2$ of the bushes 13, 16 of the first and the second support parts 4, 5. Therefore, the front part side of the turning tire at bumping is drawn to the outer side of the vehicle body due to the supporting center L of the suspension arm member 3 being positioned forwardly of the central axis m of rotation of the wheel, with the result that toe-control is changed positively to toe-out and understeering tendency (driving stability at turning is enhanced) can be set.

A description is made below of the fifth embodiment of the present invention.

Figure 10:
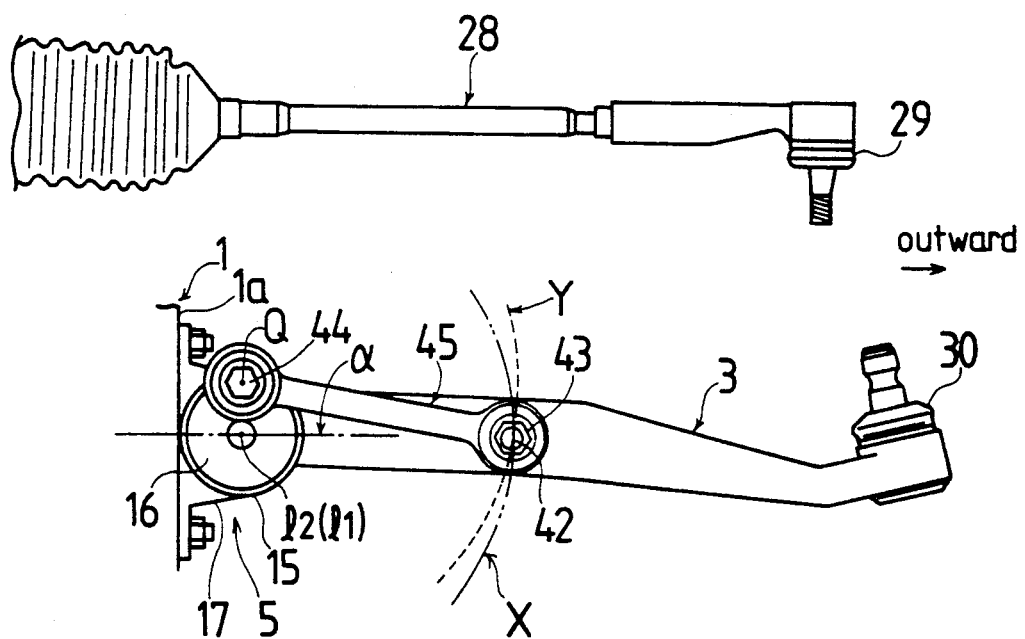
Figure 11:
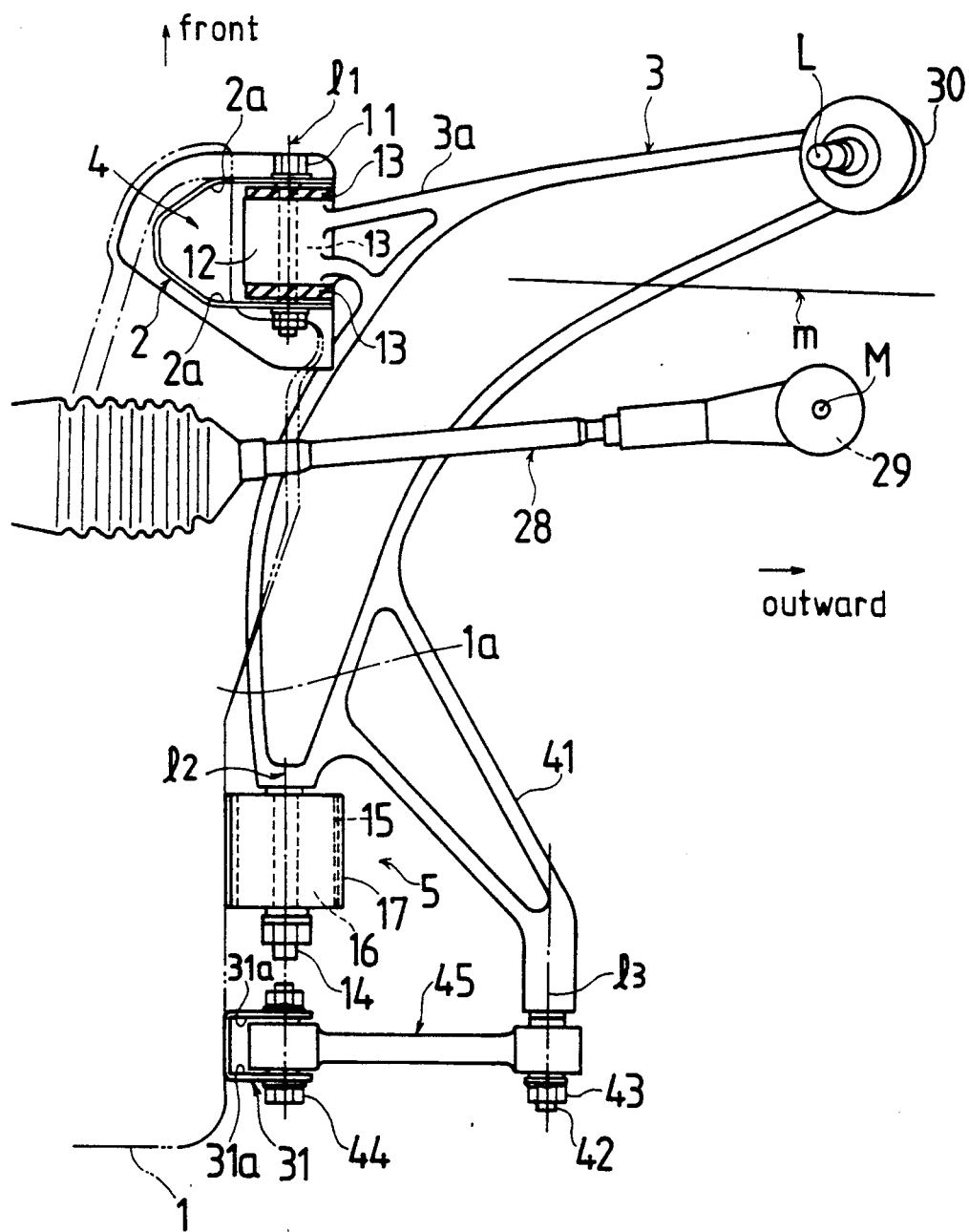
Figure 12:
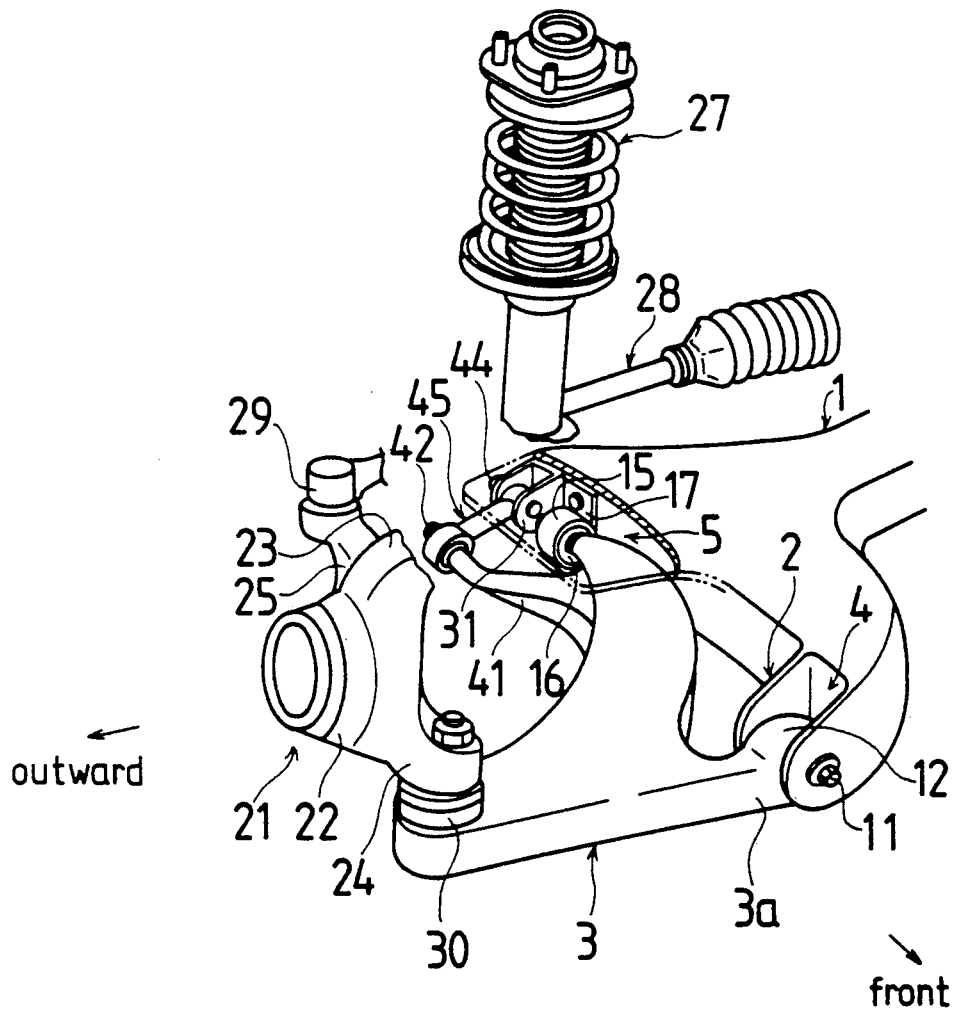

FIG. 10 through FIG. 12 show the fifth embodiment of the present invention. In this embodiment, the assist link is arranged in the rear of the suspension arm member and the supporting center on the vehicle body side of the assist link is offset above in relation to the axial center of the bush.

More particularly, provided at the rear end (rearwardly of the vehicle rear side support member 5) of the extension part 1a of the front cross member 1 is a third bracket 31 of ] shape in cross section opening to the outer side of a vehicle body. Provided at the rear end surface of the suspension arm member 3 which is outwardly of the vehicle body rear side support part 5 is a projecting arm part 41 of substantially L-shape extending diagonally, rearwardly, outwardly (and rearwardly of the vehicle body rear side support part 5). Provided at the rear end of the projecting arm part 41 is a first binding bolt 42 having an axial center $l_3$ (one-dot chain line in FIG. 11) which is in parallel with the axial centers $l_1$, $l_2$ of the bushes 13, 16 of the vehicle body front side support part 4 and the vehicle body rear side support part 5. Provided in the rear of the suspension arm member 3 and swingably to the front cross member 1 (third bracket 31) is an assist link 45 extending in right and left direction of the vehicle body with its outer end portion supported rotatably to the first binding bolt 42 of the projecting arm part 32 through the medium of a nut 43 and its inner end portion supported rotatably to a second binding bolt 44 which passes through the opposed surfaces 31a of the third bracket 31 through the medium of the nut 43.

In the above case, the swinging locus X (two-dot chain in FIG. 10) of the suspension arm member 3 is controlled by the swinging locus Y (broken line in FIG. 10) of the assist link 36 with the supporting center on the vehicle side Q positioned offset above the horizontal line 2 intersecting the axial centers $l_1$, $l_2$ of the bushes 13, 16 of the first and the second support parts at right angles. Therefore, the supporting center L on the wheel side of the suspension arm member 3 which is positioned below and in front of the central axis of rotation of the wheel is pushed to the outer side of the vehicle body as it is rotating with each vehicle body side support part 4, 5 as fulcrum, whereby the camber angle of the right front wheel is changed larger when the vehicle runs over roughness of the road, for example, namely, is so changed that inclination to the vertical line of the wheel support member becomes larger and thus the straight driving stability at running over roughness of the road, for example, can be improved effectively.

A description is made below of the sixth embodiment of the present invention.

Figure 13:
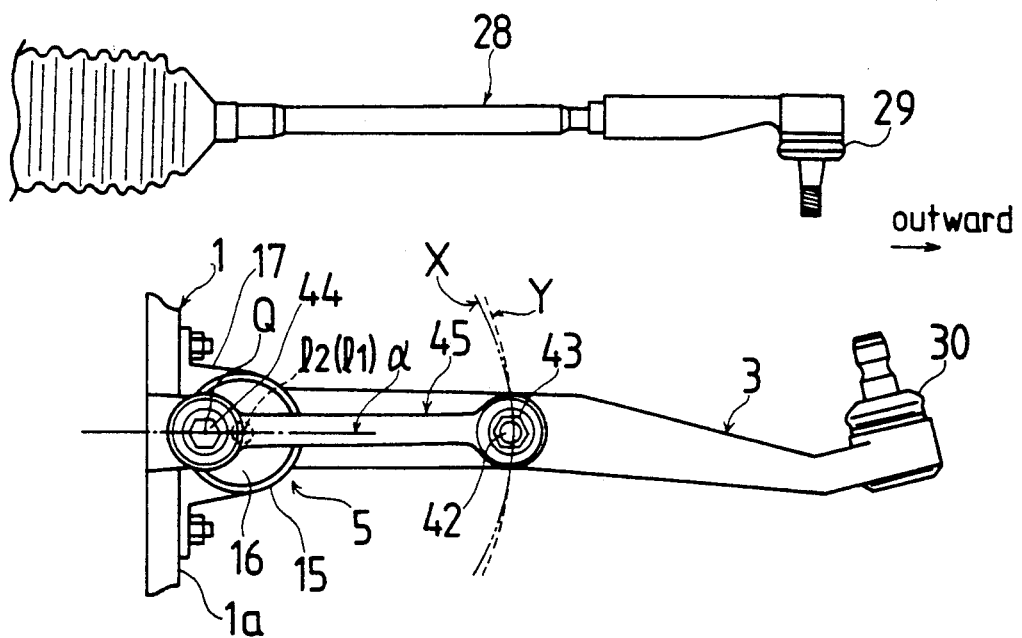
Figure 14:
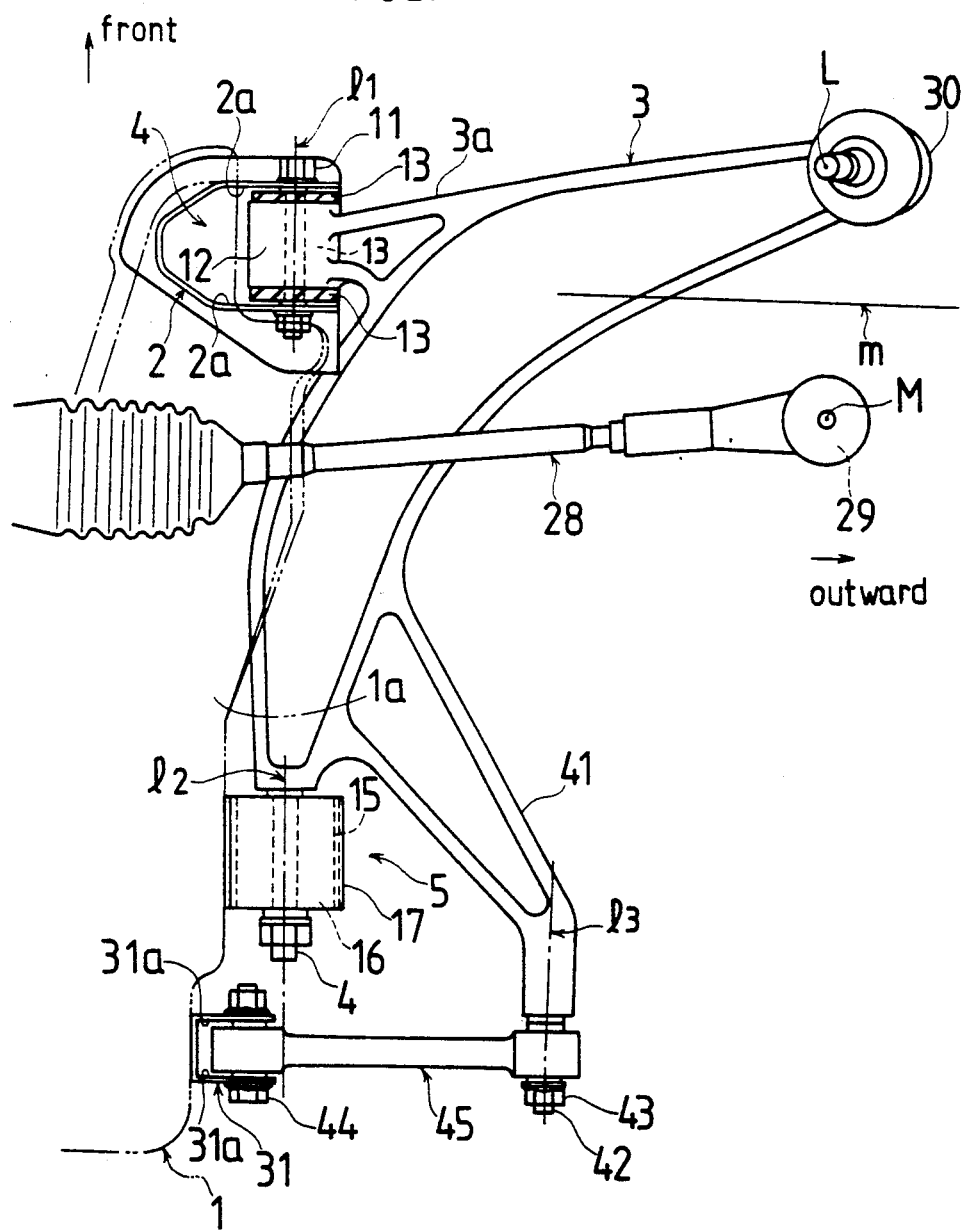

FIG. 13 and FIG. 14 show the sixth embodiment of the present invention.

FIG. 13 and FIG. 14 show the sixth embodiment of the present invention. In this embodiment, the assist link is provided in the rear of the suspension arm member and the supporting center on the vehicle body side of the assist link is offset to the inner side of the vehicle body in relation to the axial center of the bush. More particularly, the supporting center Q on the vehicle body side of the second binding bolt 44 of the assist link 45 relative to the front cross member 1 is offset to the inner side of the vehicle body relative to the axial centers $l_1$, $l_2$ of the bushes 13, 16 on the horizontal line extending in right and left direction of the vehicle body and intersecting the axial centers $l_1$, $l_2$ of the bushes 13, 16 of the first and the second support parts 4, 5 at right angles.

In the above case, the swinging locus X (two-dot chain line in FIG. 13) of the suspension arm member 3 is controlled by the swinging locus Y (broken line in FIG. 13) of the assist link 45 with the supporting center on the vehicle side Q positioned offset to the inner side of the vehicle body relative to the axial centers $l_1$, $l_2$ of the bushes 13, 16 on the horizontal line 2 intersecting the axial centers $l_1$, $l_2$ of the bushes 13, 16 of the first and the second support parts 4, 5 at right angles. Therefore, the supporting center L on the wheel side of the suspension arm member 3 which is positioned below and in front of the rotation central axis of the wheel is pushed to the outer side of the vehicle body as it is rotating with each vehicle body side support part 4, 5 as fulcrum, whereby the camber angle of the right front wheel is changed larger when the vehicle runs over roughness of the road, for example, and thus the straight driving stability at running over the roughness of the road, for example, can be improved effectively.

A description if made below of the seventh embodiment of the present invention.

Figure 15:
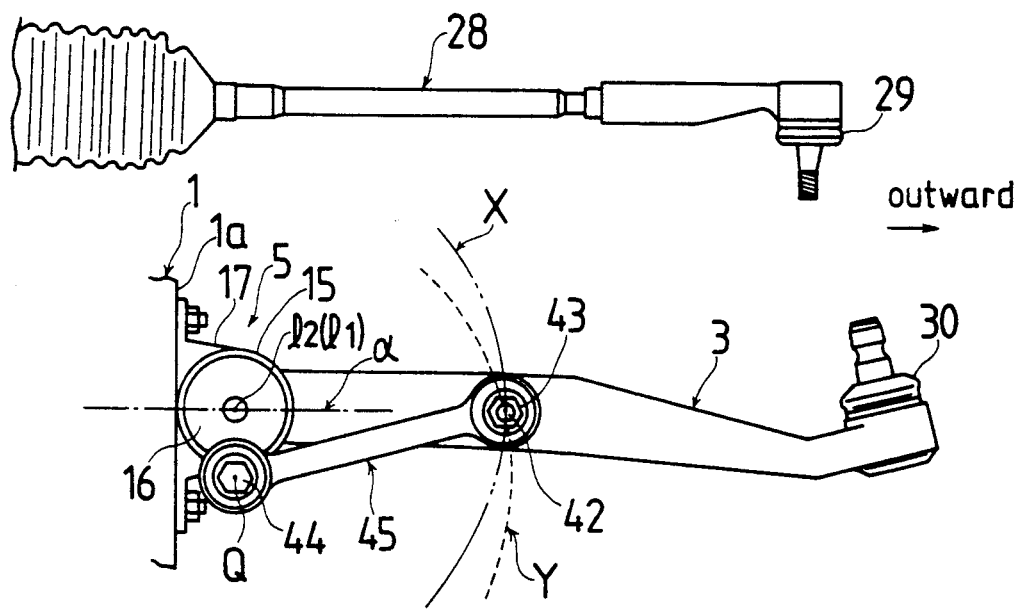
Figure 16:
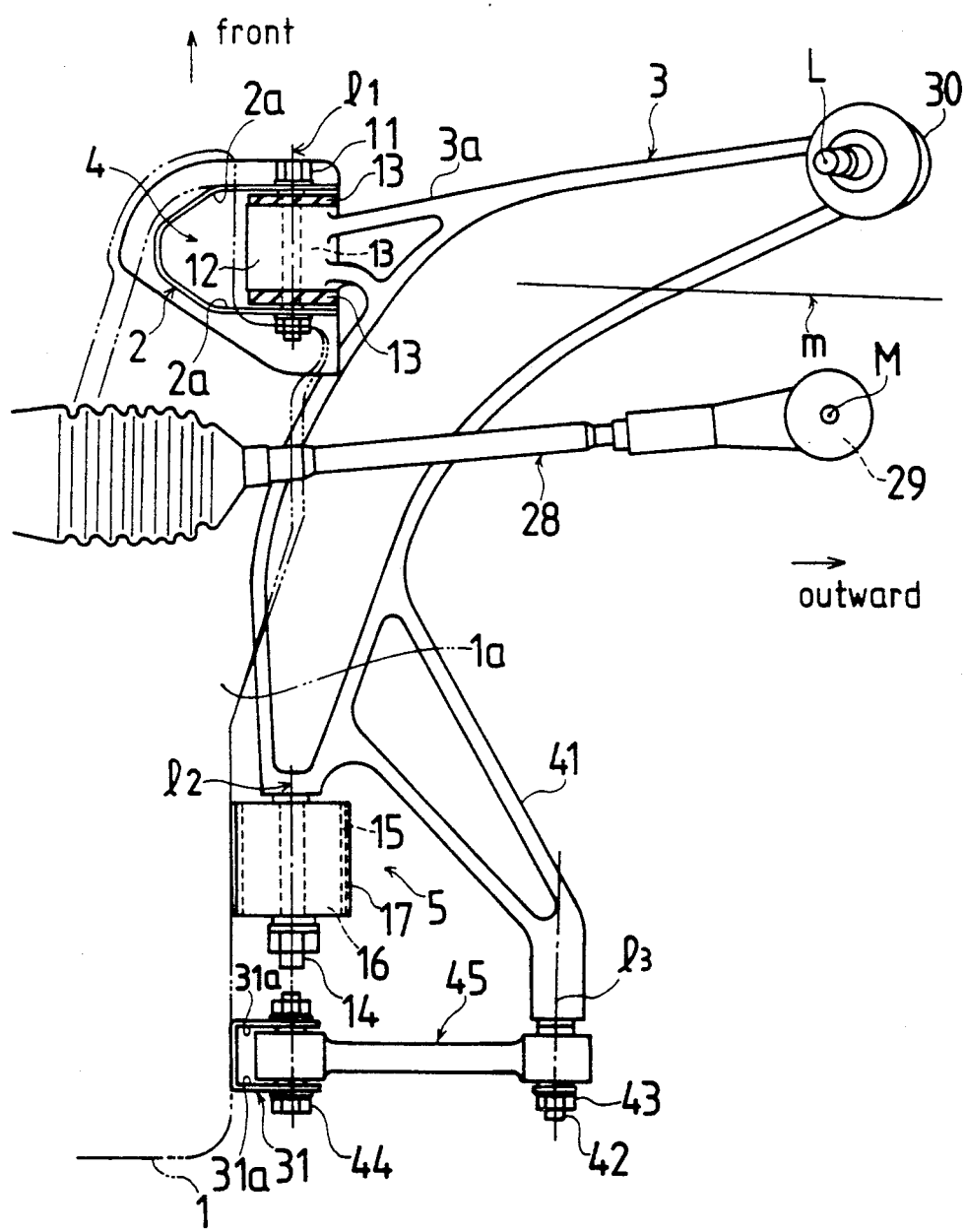

FIG. 15 and FIG. 16 show the seventh embodiment of the present invention. In this embodiment, the assist link is provided in the rear of the suspension arm member and the supporting center on the vehicle body side of the assist link is offset below the axial center of the bush.

More particularly, the supporting center Q on the vehicle body side of the second binding bolt 44 of the assist link 45 relative to the front cross member 1 is made offset below the horizontal line 2 extending in right and left direction of the vehicle body and intersecting the axial centers $l_1$, $l_2$ of the bushes 13, 16 of the first and the second support parts 4, 5.

In the above case, the swinging locus X (two-dot chain line in FIG. 15) of the suspension arm member 3 is controlled by the swinging locus Y (broken line in FIG. 15) of the assist link 45 with the supporting center on the vehicle side Q positioned offset below the horizontal line 2 intersecting the bushes 13, 16 of the first and the second support parts 4, 5 at right angles. Therefore, the supporting center L on the wheel side of the suspension arm member 3 rotates as if it were drawn to the inner side of the vehicle body with each support part on the vehicle body side 4, 5 as fulcrum, whereby quantity rearward movement of the wheel support member 21 by external force from the front direction at running over roughness of the road, for example, increases and compliance in front and rear direction can be ensured fully and also riding comfort when running over roughness of the road, for example, can be enhanced effectively.

As mentioned above, since the supporting center on the wheel side L of the suspension arm member 3 which rotates as if it were drawn to the inner side of the vehicle body at bumping is shifted below the central axis m of rotation of the right front wheel, the camber angle of the wheel support member 21 of the bumping running tire at turning is changed to a smaller angle to such an extent that steering power required at turning can be reduced.

A description is made below of the eighth embodiment of the present invention.

Figure 17:
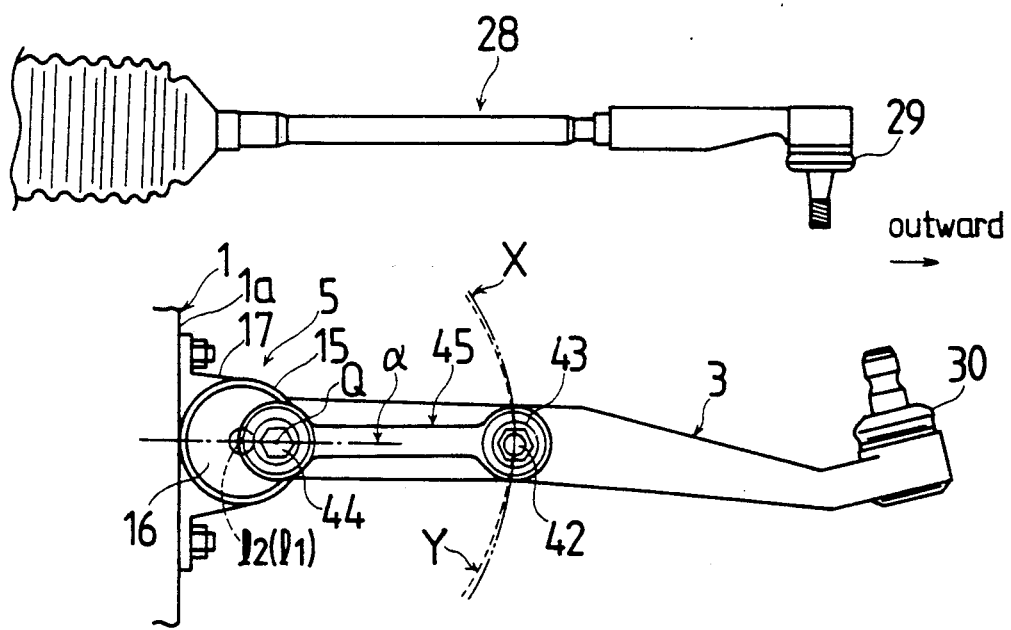
Figure 18:
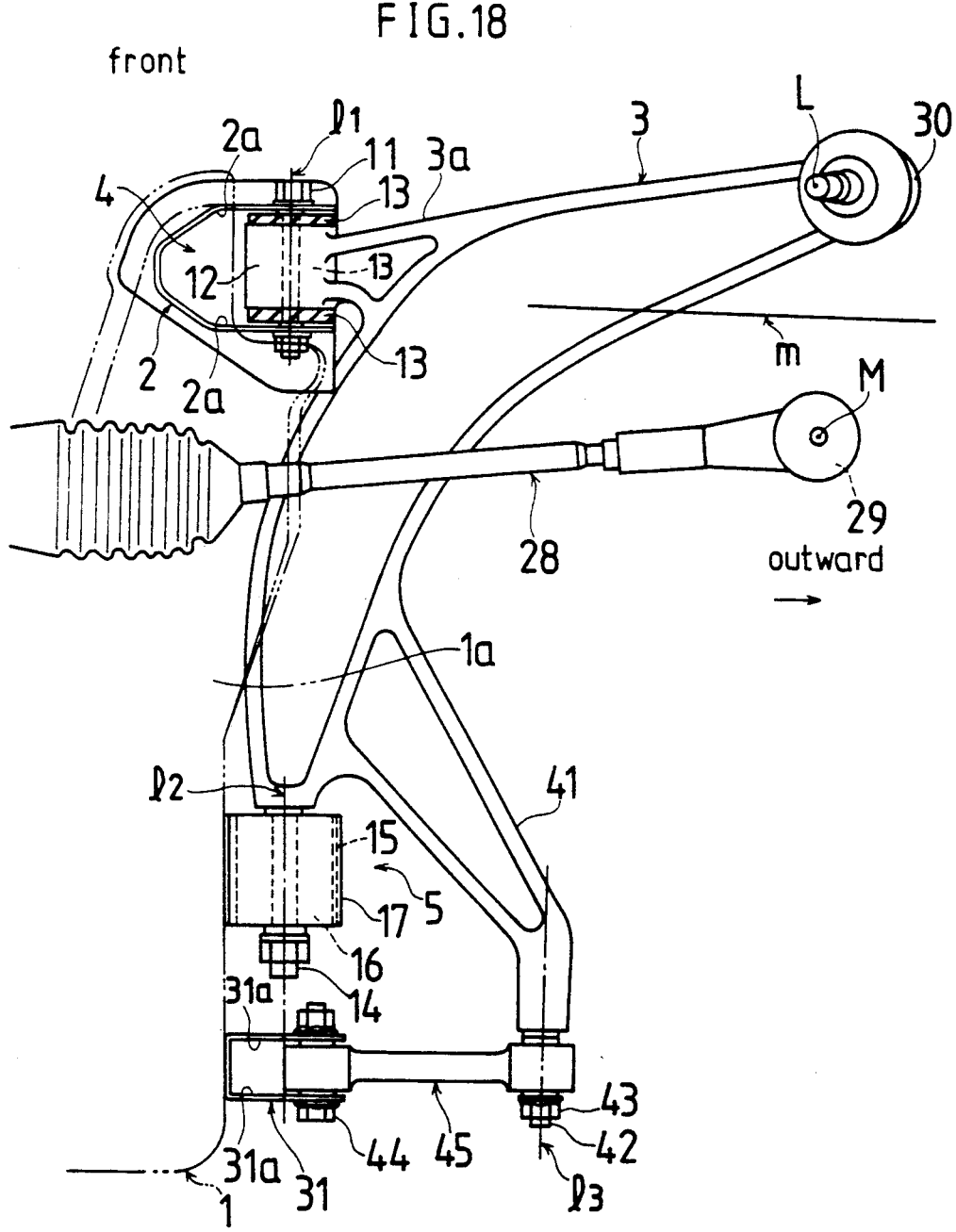

FIG. 17 and FIG. 18 show the eighth embodiment of the present invention. In this embodiment, the assist link is provided in the rear of the suspension arm member and the supporting center on the vehicle body side of the assist link is offset to the outer side of the vehicle body in relation to the axial center of the bush.

More particularly, the supporting center Q on the vehicle body side of the second binding bolt 44 of the assist link 45 relative to the front cross member 1 is made offset above the horizontal line 2 extending in right and left direction of the vehicle body and intersecting the axial centers $l_1$, $l_2$ of the bushes 13, 16 of the first and the second support parts 4, 5.

In the above case, the swinging locus X (two-dot chain line in FIG. 17) of the suspension arm member 3 is controlled by the swinging locus Y (broken line in FIG. 17) of the assist link 45 with the supporting center on the vehicle side Q positioned eccentrically to the outer side of the vehicle body on the horizontal line 2 intersecting the axial centers $l_1$, $l_2$ of the bushes 13, 16 of the first and the second support parts 4, 5. Therefore, the supporting center L on the wheel side of the suspension arm member 3 rotates as if it were drawn to the inner side of the vehicle body with each support part on the vehicle body side 4, 5 as fulcrum, whereby quantity of rearward movement of the wheel support member 21 by external force from the front direction at running over roughness of the road, for example, increases and compliance in front and rear direction can be ensured fully and also riding comfort in when running over roughness of the road, for example, can be enhanced effectively.

As mentioned above, since the supporting center on the wheel side L of the suspension arm member 3 which rotates as if it were drawn to the inner side of the vehicle body at bumping is shifted below the central axis m of rotation of the right front wheel, the camber angle of the wheel support member 21 of the bumping turning tire at turning is changed to a smaller angle to such an extent that steering power required at turning can be reduced.

The present invention is not limited to the above embodiments but includes various modified embodiment, for example, in each of the above embodiments reference is made to the case where the supporting center L on the wheel side of the suspension arm member 3 is positioned frontwardly of the central axis m of rotation of the wheel but it is a matter of course that the present invention is applicable to the case where the supporting point (the first joint) of the wheel supporting member and the side end part of the tie rod is positioned frontwardly of the central axis of rotation of the right front wheel and the supporting point on the wheel side of the suspension arm member is positioned rearwardly of the central axis of rotation of the wheel. In this case, the rear side part of the turning tire at bumping (referred to in respect of FIG. 1 through FIG. 4) is drawn to the inner side of the vehicle body and the toe-control is changed positively to the toe-out, namely, the understeering tendency (driving stability at turning is enhanced) can be set.

In each of the above embodiments, reference is made to the case where the assist link 34 (45) is provided for the suspension arm member 3 of wishbone type but the present invention is applicable to the suspension of double wishbone type, strut type, etc.

What is claimed is:

1. A suspension system for vehicles provided with a suspension arm member whose inner end is pivotally connected to a vehicle body member at two points spaced apart in a longitudinal direction of the vehicle body, each of said points utilizing a bush having an axial center extending in a horizontal direction, said arm member having an outer end pivotally connected to a wheel support member and an assist link pivotally connected to an intermediate part of said suspension arm member and said vehicle body member, the improvement comprising:

a supporting center on the wheel support member side at the outer end of said suspension arm member being offset from a central axis of rotation of an associated wheel and a supporting center on the vehicle side of said assist link being offset from the axial center of the bushes, said link extending in a widthwise direction of said vehicle between said arm member and said vehicle body member, wherein a supporting center of the assist link at the arm member is located outward of the vehicle body member and outward the axial center of the bushes horizontally extending on the inner end of the suspension arm member, such that desired wheel movement in response to travel on a rough road is achieved while maintaining riding comfort.

2. A suspension system for vehicles as set forth in claim 1, wherein the assist link is pivotally connected to an intermediate part of the suspension arm member and the vehicle body member at a front of the suspension arm member.

3. A suspension system for vehicles as set forth in claim 1, wherein the assist link is pivotally connected to the intermediate part of the suspension arm member and the vehicle body member at a rear of the suspension arm member.

4. A suspension system for vehicles as set forth in claim 2, wherein the supporting center on the wheel support member side of the suspension arm member is pivotally connected to the wheel support member at a position shifted horizontally from the central axis of rotation of the wheel.

5. A suspension system for vehicles as set forth in claim 2, wherein the supporting center on the wheel support member side of the suspension arm member is pivotally connected to the wheel support member at a position shifted below the central axis of rotation of the wheel.

6. A suspension system for vehicles as set forth in claim 3, wherein the supporting center on the wheel support member side of the suspension arm member is pivotally connected to the wheel support member at a position shifted horizontally from the central axis of rotation of the wheel.

7. A suspension system for vehicles as set forth in claim 3, wherein the supporting center on the wheel support member side of the suspension arm member is pivotally connected to the wheel support member at a position shifted below the central axis of rotation of the wheel.

8. A suspension system for vehicles as set forth in claim 4, wherein the supporting center on the vehicle body side of the assist link is offsets below a horizontal line intersecting the axial center of the bushes of the suspension arm member at a right angle and extending in a widthwise direction of the vehicle body.

9. A suspension system for vehicles as set forth in claim 4, wherein the supporting center on the vehicle body side of the assist link is offset above a horizontal line intersecting the axial center of the bushes of the suspension arm member at a right angle and extending in a widthwise direction of the vehicle body.

10. A suspension system for vehicles as set forth in claim 4, wherein the supporting center on the vehicle body side of the assist link is offset from the outer side of the vehicle body relative to the axial center of the bushes on a horizontal line intersecting the axial center of the bushes of the suspension arm member at a right angle and extending in a widthwise direction of the vehicle body.

11. A suspension system for vehicles as set forth in claim 4, wherein the supporting center on the vehicle body side of the assist link is offset from the inner side of the vehicle body relative to the axial center of the bushes on a horizontal line intersecting the axial center of the bushes of the suspension arm member at a right angle and extending in a widthwise direction of the vehicle body.

12. A suspension system for vehicles as set forth in claim 5, wherein the supporting center on the vehicle body side of the assist link is offset below a horizontal line intersecting the axial center of the bushes of the suspension arm member at a right angle and extending in a widthwise direction of the vehicle body.

13. A suspension system for vehicles as set forth in claim 5, wherein the supporting center on the vehicle body side of the assist link is offset above a horizontal line intersecting the axial center of the bushes of the suspension arm member at a right angle and extending in a widthwise direction of the vehicle body.

14. A suspension system for vehicles as set forth in claim 5, wherein the supporting center on the vehicle body side of the assist link is offset to the outer side of the vehicle body relative to the axial center of the bushes on a horizontal line intersecting the axial center of the bushes of the suspension arm member at a right angle and extending in a widthwise direction of the vehicle body.

15. A suspension system for vehicles as set forth in claim 5, wherein the supporting center on the vehicle body side of the assist link is offset to the inner side of the vehicle body relative to the axial center of the bushes on a horizontal line intersecting the axial center of the bushes of the suspension arm member at a right angle and extending in a widthwise direction of the vehicle body.

16. A suspension system for vehicles as set forth in claim 6, wherein the supporting center on the vehicle body side of the assist link is offset below a horizontal line intersecting the axial center of the bushes of the suspension arm member at a right angle and extending in a widthwise direction of the vehicle body.

17. A suspension system for vehicles as set forth in claim 6, wherein the supporting center on the vehicle body side of the assist link is offset above a horizontal line intersecting the axial center of the bushes of the suspension arm member at a right angle and extending in a widthwise direction of the vehicle body.

18. A suspension system for vehicles as set forth in claim 6, wherein the supporting center on the vehicle body side of the asist link is offset to the outer side of the vehicle body relative to the axial center of the bushes on a horizontal line intersecting the axial center of the bushes of the suspension arm member at a right angle and extending in a widthwise direction of the vehicle body.

19. A suspention system for vehicles as set forth in claim 6, wherein the supporting center on the vehicle body side of the assist link is offset to the inner side of the vehicle body relative to the axial center of the bushes on a horizontal line intersecting the axial center of the bushes of the suspension arm member at a right angle and extending in a widthwise direction of the vehicle body.

20. A suspension system for vehicles as set forth in claim 7, wherein the supporting center on the vehicle body side of the assist link is offset below a horizontal line intersecting the axial center of the bushes of the suspension arm member at a right angle and extending in a widthwise direction of the vehicle body.

21. A suspension system for vehicles as set forth in claim 7, wherein the supporting center on the vehicle body side of the assist link is offset above a horizontal line intersecting the axial center of the bushes of the suspension arm member at a right angle and extending in a widthwise direction of the vehicle body.

22. A suspension system for vehicles as set forth in claim 7, wherein the supporting center on the vehicle body side of the assist link is offset to the outer side of the vehicle body relative to the axial center of the bushes on a horizontal line intersecting the axial center of the bushes of the suspension arm member at a right angle and extending in a widthwise direction of the vehicle body.

23. A suspension system for vehicles as set forth in claim 7, wherein the supporting center on the vehicle body side of the assist link is offset to the inner side of the vehicle body relative to the axial center of the bushes on a horizontal line intersecting the axial center of the bushes of the suspension arm member at a right angle and extending in a widthwise direction of the vehicle body.

24. A suspension system for vehicles as set forth in claim 1, wherein said suspension arm member includes a projecting arm part extending rearwardly and supporting at its rear end portion said assist link.

25. A suspension system for vehicles as set forth in claim 24, wherein said rear end portion of said projecting arm part extends rearwardly of a vehicle body rear side support part of said suspension arm member.

* * * * *

UNITED STATES PATENT AND TRADEMARK OFFICE
CERTIFICATE OF CORRECTION

PATENT NO. : 5,158,320
DATED : October 27, 1992
INVENTOR(S) : Fumitaka Ando, et. al.

It is certified that error appears in the above-indentified patent and that said Letters Patent is hereby corrected as shown below:

Column 11, line 54, change "offsets" to --offset--.

Column 12, line 1, change "bushes" to --bush--.

Column 12, line 55, change "asist" to --assist--.

Signed and Sealed this

First Day of February, 1994

Attest:

BRUCE LEHMAN

*Attesting Officer*  *Commissioner of Patents and Trademarks*